Nov. 3, 1936.    H. J. DILLON    2,059,854
VEHICLE STRUCTURE
Filed May 25, 1934
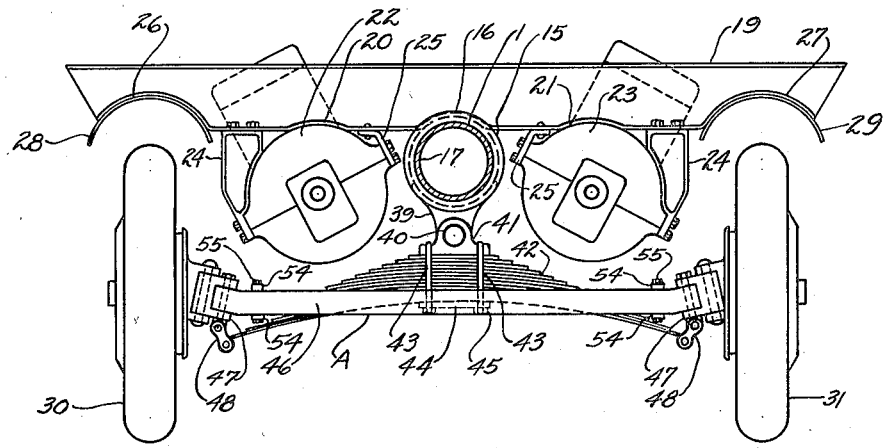
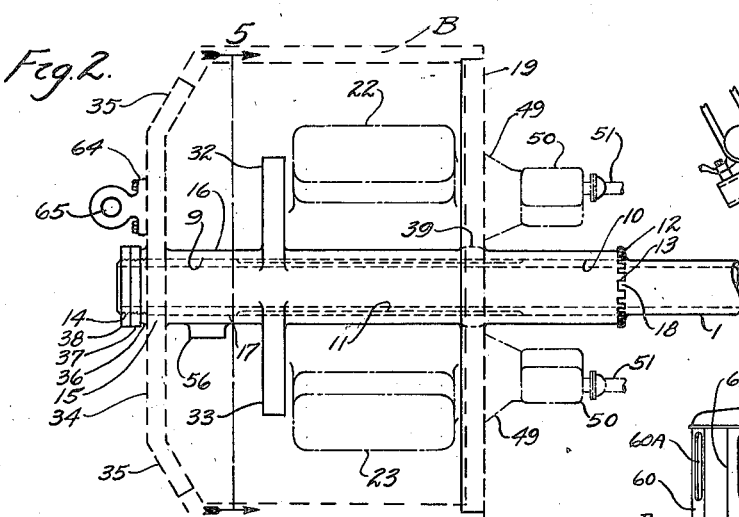
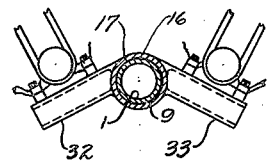
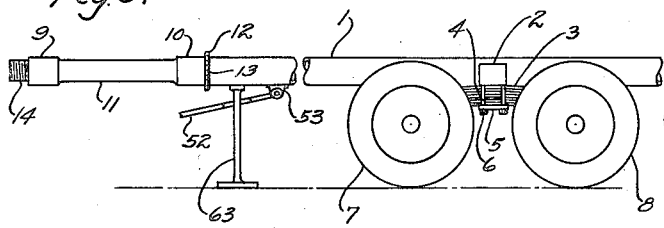
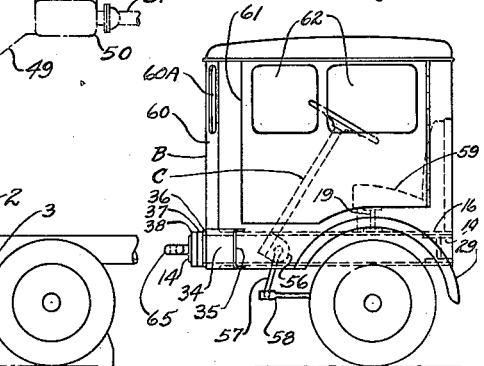
INVENTOR.
Hugh Joseph Dillon
BY George B. Ingersoll
ATTORNEY.

Patented Nov. 3, 1936

2,059,854

UNITED STATES PATENT OFFICE 2,059,854

VEHICLE STRUCTURE

Hugh Joseph Dillon, Highland Park, Mich.

Application May 25, 1934, Serial No. 727,396

13 Claims. (Cl. 180—12)

My invention relates to improvements in a vehicle structure in which portions of the vehicle are removed for service operation purposes; and the objects of my improvement are, first, to provide a vehicle structure having a removable portion supporting the power plant assembly of the vehicle; second, to provide a vehicle structure having a removable portion supporting the cab of the vehicle; third, to provide a vehicle structure having a removable portion supported on an axle having wheels and adapted to be removed from the vehicle by being transported on the wheels of the axle; fourth, to provide a vehicle structure having a tubular frame member together with a housing telescopically mounted thereon for supporting units of the vehicle; fifth, to provide a vehicle structure having a frame member extending longitudinally at the longitudinal center of the vehicle together with a removable housing supported thereon, the removable housing being provided with cross members for supporting engines, cab, and similar units forming portions of the vehicle; sixth, to provide a vehicle structure with a removable unit adapted to support fenders of the vehicle; seventh, to provide a vehicle structure having a removable portion supporting a cross member utilized as a bumper member of the vehicle; eighth, to provide a vehicle having axles with a structure permitting one of the axles, together with its supported mechanism, to be wheeled away from the remainder of the vehicle; and ninth, to provide a removable portion of a vehicle with means permitting ready connection with a unit utilized as a tractor for hauling the removable portion of the vehicle.

I attain these objects by the mechanism illustrated in the accompanying drawing, in which—

Figure 1 is a vertical section through the front portion of a chassis provided with my vehicle structure and disclosing the cab and engine supporting mechanism, together with the front axle of the vehicle and without the cab mounted thereon; Fig. 2, a plan view of the front end of the frame of the vehicle structure together with the cab and engine supporting mechanism supported thereon; Fig. 3, a side view of the vehicle structure with the cab and engine unit having been removed therefrom; Fig. 4, discloses the cab and engine unit together with the front axle as having been removed from the vehicle; and Fig. 5 discloses a sectional view through the front end of the vehicle structure, said sectional view being taken on the line 5—5, Fig. 2.

Similar numerals refer to similar parts throughout the several views.

The vehicle is provided with a frame mechanism having the tubular member 1 which extends substantially at the longitudinal center of the vehicle and comprises the main frame member of the frame mechanism.

The tubular member 1 is provided with the cross members 2 which are suitably connected with the tubular member 1 and is adapted to support the rear springs 3 which may be connected thereto by the clips 4, the plate 5, and the nuts 6, as disclosed in Fig. 3.

The rear wheels 7 and 8 are suitably connected with and mounted on the springs 3 and thus support the rear end of the vehicle structure. The tubular member 1 is provided with the journal portions 9 and 10 at its forward end, the journal portions 9 and 10 being separated by a relief or undercut portion 11. The tubular member 1 is further provided with the flange 12 which is suitably provided with a series of notches or grooves 13. The tubular member 1 is further provided with the threaded end 14 adjacent the shoulder portion 9.

The housing or structure 15 is provided with the tubular portion 16 at its central portion, the tubular portion 16 being provided with the bore 17 which extends therethrough and forms a bearing on the journal portions 9 and 10 of the tubular member 1.

The tubular portion 16 may be provided with suitable tongue or extensions 18 for engaging the notches 13 in the flange 12 to lock the housing 15 from turning on the journal portions 9 and 10 of the tubular member 1 when assembled thereon as shown in Fig. 2. The housing 15 is provided with arms extending on opposite sides thereof to form the cross member 19. The cross member 19 may be formed integrally with the housing 15 or may be formed as a separate cross member unit and suitably secured to the housing 15. The cross member 19 is provided with the curved surfaces 20 and 21 at its lower side for receiving and engaging the housing portions of the engine assemblies 22 and 23.

The engine assemblies 22 and 23 are suitably secured to the cross member 19 by the brackets 24 located at the outside of the engine assemblies 22 and 23, and also by the brackets 25 which are suitably connected to the engine assemblies 22 and 23 at their inner sides, the brackets 24 and 25 being further secured to the underside of the cross member 19. The cross member 19 is further provided with the curved surfaces 26 and 27 for receiving and engaging the fenders 28 and 29 which are adapted to extend over the front wheels 30 and 31.

The housing 15 is further provided with the arms 32 and 33 which extend on opposite sides of the housing 15 and form members for suitably supporting the front ends of the engine assemblies 22 and 23 as disclosed in Fig. 5.

The arms 32 and 33 may be formed as an integral portion of the housing 15 or they may be constructed as separate units and suitably secured to the housing member 15.

The housing 15 is further provided with the cross member 34 located at its forward side, the cross member 34 being provided with the rearwardly extending portions 35. The housing 15 will be provided with the boss 36 adjacent the cross member 34 for engaging the lock nut 37 which threadably engages the threaded portion 14 and is adapted to secure the housing 15 in its assembled position on the journal portions 9 and 10 of the tubular member 1.

The lock nut 38 also threadably engages the threaded portion 14 of the tubular member 1 and serves as a second member for maintaining the lock nut 37 in its locked position.

The housing 15 is further provided with the boss 39 at its lower side for supporting the trunnion shaft 40 upon which is pivotally mounted the spring seat 41 to which is secured the front spring 42 by means of the clips 43, the plate 44, and the nuts 45.

It is to be noted that the front axle assembly A, as disclosed in Fig. 2, is of the general construction disclosed and claimed in my patent application, Serial No. 681,849, filed July 24, 1933 for Spring and axle construction for vehicles.

The axle assembly A is provided with the axle beams 46 which are located on opposite sides of the front spring 42 and are connected by members 47 to the wheel assemblies 30 and 31, the front spring 42 being pivotally connected to the members 47 by the shackles 48.

The engine assemblies 22 and 23 are suitably provided with the clutch housings 49 which support transmissions indicated at 50 and which are suitably provided with propeller shafts 51 which may be suitably connected with the rear driving mechanism of the truck or vehicle.

The front axle assembly A will be connected to the radius rod member 52 which is indicated in Fig. 3, the radius rod 52 being pivotally connected to the boss 53 which is suitably secured to the tubular member 1, the front end of the radius rod 52 being suitably connected by the flanges 54 and the bolts 55 to the axle beams 46 of the front axle assembly A.

It is to be noted that the cab assembly B will be suitably mounted at its forward end on the cross member 34 and at its rear side on the cross member 19, the cab assembly B thus being supported by the housing 15.

It is to be noted that the fenders 29 will be supported by the cross member 19 and suitably arranged relative to the cab assembly B. The cross members 34 with its outwardly extending portions 35 will be suitably arranged relative to the cab assembly B to form a bumper member for the cab assembly B and the vehicle.

The steering gear assembly C will be suitably mounted on the boss 56 which will be formed on the housing 15, the steering gear being suitably connected by means of the arm 57 and the drag link 58 with the front axle assembly A. The cab assembly B will be provided with the seat 59 located at its central portion in line with that portion of the cab extending over the tubular portion 16 of the housing 15, thus providing a passageway between the engine assemblies 22 and 23 from the seat 59 to the door 60 located at the front side of the cab assembly B and over the tubular portion 16 of the housing 15, thus providing an entrance to the front end of the cab assembly B and a walkway between the engines 22 and 23 to the seat 59. The door 60 is provided with windows, one of which is indicated at 60A.

The cab assembly B may be further provided with the side doors or panels 61 which will permit of entrance from the side of the cab assembly B as desired, the side doors or panels 61 being suitably provided with the windows 62.

It is thus to be noted that I have provided means whereby the cab assembly B, the steering gear assembly C, the engine assemblies 22 and 23, the front fenders 29, together with the front axle assembly A may be removed from the vehicle as a unit when it is desired to perform any service work on any parts comprising the removable unit, such as for repair work on the engine assemblies 22 and 23, thus enabling substantially the whole front end of the vehicle to be removed from the vehicle and a new removable unit replaced thereon with a minimum of time and operations.

This is accomplished by removal of the lock nuts 38 and 37 and sliding the housing 15, together with its supported units, off of the journal portions 9 and 10 of the tubular member 1, the housing 15, together with its supported units, rolling away and from the vehicle on its own wheels 30 and 31.

When the housing 15 and its supported unit, together with the front axle assembly A, are being rolled away from connection with the vehicle, the tubular member 1 will be supported by a conventional jack or supporting assembly 63 which will support the front end of the tubular member 1 and thus the front end of the chassis in a conventional way while the second or service housing 15, together with its cab assembly B and steering gear assembly C, and the front axle assembly A, are being wheeled into a position again on the vehicle.

Also to further facilitate the removal of the cab assembly B, the steering gear assembly C, the engine assemblies 22 and 23, the fenders 29, the housing 15, and the front axle assembly A as a unit on the wheels 30 and 31, the member 64 or similar mechanism may be suitably attached to the cross member 34, said member 34 being provided with the pintle eye 65 to permit connection with a draw bar mechanism of a tractor or similar vehicle which may thus be used to furnish the necessary power to move the above mentioned units away from the vehicle equipped therewith. If desired the member 64 may be suitably attached to the housing 15 at a point below the cross member to enable the pintle eye 65 to be located on the longitudinal center of the vehicle, said mounting of said member 64 in Fig. 2 being disclosed as a convenient and economical way of installing same.

I claim:

1. In a vehicle structure including a cab, a pair of engines, and a front axle assembly with wheels, the combination of a tubular frame member extending longitudinally of and at the longitudinal center of the vehicle and provided with journal portions together with a flange adjacent said journal portions, said flange being provided with grooves, a tubular housing supported on said journal portions of said tubular frame member and provided with jaw portions engaging the grooves of the flange of said tubular frame member, said tubular housing being provided with cross members for suporting said pair of engines on oppositely disposed sides of said tubular housing, said cross members further supporting said cab, means for retaining said tubular housing on the journal portions of said tubular frame member, and means for connecting said front axle assembly with said tubular housing.

2. In a vehicle provided with an engine mechanism together with a cab, the combination of a frame member, and a housing member telescopically mounted on said frame member and provided with a cross member located at its outer end together with a pair of cross members intermediate the ends of said housing member, one of said cross members intermediate the ends of said housing member having a lesser length than the other of said pair of cross members, said first mentioned and said cross member of said pair of cross members intermediate the ends of said housing member having the greater length being utilized for supporting the cab, said pair of cross members intermediate the ends of said housing member being utilized for supporting the engine mechanism, said cross member having the lesser length comprising a pair of arm members, each of said arm members extending outwardly and downwardly relative to said housing member to provide a lower mounting of said engine mechanism.

3. In a vehicle structure provided with a cab together with a steering axle, the combination of a main frame member extending to the front end of the vehicle and above the steering axle, a second frame member slidably mounted on said main frame member and extending to the front end of the vehicle and above the steering axle, said second frame member adapted to support said cab, said second frame member being removable from said main frame member, retainer means for securing said second frame member on said main frame member, said retainer means being located at the front end of the vehicle and adjacent the front side of the cab, means for connecting the axle to said second frame member, and means for supporting said main frame member after said second frame member has been removed from said main frame member.

4. In a vehicle provided with engines and a cab, the combination of a frame member provided with an abutment portion having grooves therein, and a structure slidably mounted on said frame member and supporting said engines and cab, said structure being provided with an end having tooth portions engaging said grooves of said frame member to lock said frame member and said structure against movement relative to one another.

5. In a vehicle structure provided with a cab, together with a pair of engine assemblies, the combination of a frame member, a structure mounted on said frame member and provided with a pair of transverse cross members respectively located at the front and rear sides of and supporting said cab, the rearmost of said transverse cross members being located at the rear of and supporting said pair of engine assemblies, said structure being further provided with a third transverse member located between said pair of said transverse cross members, said third transverse cross member being located at the front ends of and supporting the pair of engine assemblies, said third transverse cross member being provided with outwardly and downwardly extending portions to permit lowering of the axial centers of the pair of engine assemblies, and means for removing said structure together with the cab and said pair of engine assemblies from said frame member of the vehicle.

6. In a vehicle structure provided with engines together with a cab, the combination of a frame member provided with journal portions together with a shouldered portion and a threaded portion located at the ends of said journal portions, a housing member mounted on said journal and abutting said shouldered portions of said frame member, said housing member being provided with means for supporting said engines and cab, and means engaging said threaded portion of said frame member for retaining said housing member on said journal portions of said frame member.

7. In a vehicle structure provided with a cab, the combination of a frame member, a housing member telescopically mounted on said frame member and provided with a pair of cross members for supporting said cab, one of said cross members being located and forming a bumper means adjacent the forward side of said cab, means at the rear end of said housing member for maintaining said housing member from rotating on said main frame member, and means for retaining said housing member on said frame member, said means being located adjacent the forward side of said bumper means.

8. In a vehicle structure provided with a frame member together with a structure comprising a cab and engines, said structure being adapted to be removed from said main frame member by being hauled away with a tractor or similar means, the combination of a housing member removably mounted on said frame member and provided with means for supporting said cab and engines, a sole axle means provided with wheels, said sole axle means being pivotally connected with and supporting said housing member together with said cab and engines, a steering gear assembly in said cab and extending adjacent said housing member, bracket means mounted on said housing member and supporting said steering gear assembly, and drag link mechanism connecting said steering gear assembly and said sole axle means to permit steering of said sole axle means and its wheels by operation of said steering gear mechanism when said housing and said cab and engines are being removed from said frame member by being hauled away by said tractor or similar means.

9. In a vehicle structure provided with a front axle assembly together with torque means connected therewith, the combination of a frame member extending longitudinally at the longitudinal center of the vehicle, a housing member removably mounted on said frame member, means pivotally connecting said front axle assembly to said housing member, a second means pivotally connecting said torque means to said housing member, and a third means for retaining said housing member on said frame member.

10. In a vehicle structure provided with engines, cab, and an axle having wheels together with fenders, the combination of a frame member, a housing member telescopically mounted on said frame member and provided with cross members for supporting said cab, one of said cross members extending over the wheels of said axle, means for supporting said fenders on said one of said cross members and over said wheels, means for supporting said engines on said cross members of said housing, and means for connecting said axle with said housing member to enable said engines, cab, and axle together with said fenders to be hauled away on said wheels from the remainder of the vehicle structure.

11. In a vehicle structure provided with a steering axle assembly together with a cab and engines, the combination of a frame member, a tubular housing mounted on said frame member and provided with arms for supporting the cab and engines, said tubular housing being provided with a boss at one of its sides for supporting the steering gear assembly, a sole axle assembly operatively connected with the steering gear assembly and rollably supporting said tubular housing and its supported mechanism to permit transportation thereof from the remainder of the vehicle structure, said steering gear assembly being utilized for steering said sole axle assembly in its movement away from the remainder of the vehicle structure.

12. In a vehicle structure, the combination of a frame member provided with a journal portion together with an abutment portion thereadjacent, a housing member slidably mounted on said journal portion and engaging said abutment portion, and threaded means engaging one end of said journal portion and said housing member to retain said housing member on said journal portion and in contact with said abutment portion.

13. In a vehicle structure, the combination of a frame member provided with a journal portion having a grooved abutment thereadjacent, a housing member mounted on said journal portion and having its end provided with extension portions and engaging the grooves of said abutment portion to prevent said housing member from rotating on said journal portion, and means for securing said housing member longitudinally on said journal portion.

HUGH JOSEPH DILLON.